Patented Sept. 6, 1932

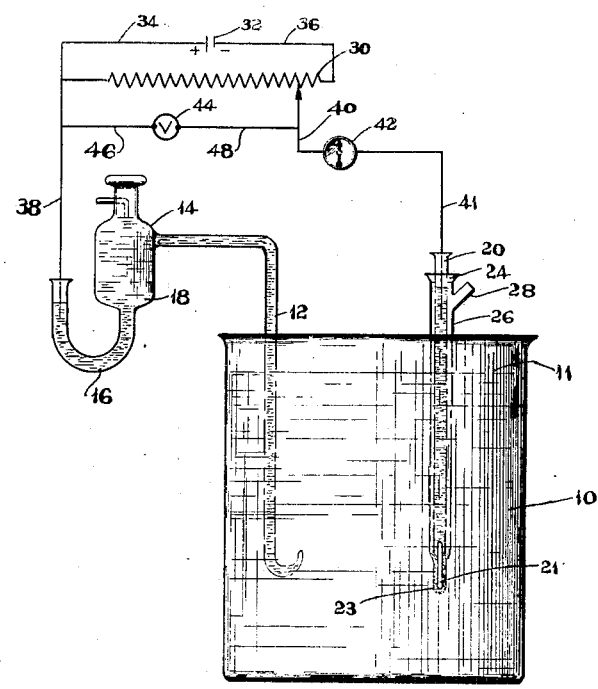
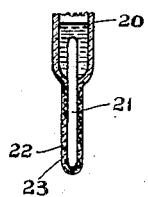

1,875,503

UNITED STATES PATENT OFFICE

BEN W. ROWLAND, OF APPLETON, WISCONSIN, ASSIGNOR TO THE GOODYEAR TIRE & RUBBER COMPANY, OF AKRON, OHIO, A CORPORATION OF OHIO

PROTECTED HYDROGEN ELECTRODE

Application filed January 6, 1931. Serial No. 506,903.

My invention relates to electrodes for the determination of the ion concentration in solutions of various types. It has particular relation to hydrogen ion electrodes employed to determine the acidity of solutions containing a colloidal material which tends to deposit upon the electrodes.

One of the objects of the invention is to provide a semi-permeable barrier for hydrogen ion electrodes which will permit diffusion of hydrogen ions but which effectively prevents the deposition of colloidal materials contained in the solution under observation upon the electrode. Other objects and advantages will become apparent from the succeeding description.

In the treatment of colloidal solution, such as latex from which rubber and balata are obtained by coagulation, it is desirable to maintain the hydrogen ion concentration of the suspension at a definite predetermined value prior to coagulation in order to insure uniformity of the product obtained by coagulation and to prevent premature coagulation by reason of the presence of an excessive number of positive hydrogen ions which tend to cause precipitation of such negatively charged colloidal particles as constitute the rubber hydrocarbon globules in latex.

In actual practice, it is most convenient to determine this hydrogen ion or Ph value by means of a hydrogen ion electrode and a standard calomel electrode, both of conventional design. Unfortunately, where the hydrogen ion electrode is employed in latex or similar suspensions containing negatively charged hydrocarbon globules, the globules tend, during the adjustment of the potentiometer, to settle on the hydrogen ion electrode and lose their charges. They deposit as impermeable films which effectively insulate the pole, thus greatly reducing or entirely preventing contact of the electrode with hydrogen gas which is essential to the operation of the hydrogen electrode for determining the ion concentration of the bath in which it is immersed.

My invention resides in the discovery that the deposition of impermeable films upon the hydrogen ion electrode may be prevented by the use of a semi-permeable film or membrane about the electrode. This membrane, while it effectively prevents the contact of relatively large globules of colloidal material with the electrode, is of such porous character that it permits inward flow of hydrogen gas from a source of supply and outward diffusion of hydrogen ions from the electrode into the solution, the acidity of which is to be determined, thus maintaining the resistance of the electrode at a substantially uniform value.

For a better understanding of the invention, reference may now be had to the drawing, forming a part of the specification, in which:

Fig. 1 is a diagrammatical view representing a convenient embodiment of apparatus which may be employed in practicing the invention; and Fig. 2 is a fragmentary view of a hydrogen ion electrode embodying the principal feature of the invention.

In practicing the invention, a beaker or other suitable container 10 is filled with latex or other collodial solution 11, the ion concentration of which is to be determined, and a siphon arm 12 of a standard calomel electrode of conventional design and including a container 14 is then disposed in the solution. This calomel electrode includes a branch 16 of U-shape which is partially filled with mercury or other suitable conductive fluid, which, in the branch of the tube adjacent the container 14, contacts with a layer of calomel 18 immersed in a solution of potassium chloride that entirely fills the container 14 and the branch 12.

Any suitable design of hydrogen electrode may be employed in connection with the invention disclosed. However, for purposes of illustration, there is shown a tube 20 substantially filled with mercury that contacts with a suitable electrode 21, which is sealed into the lower end of the tube. The electrode is formed of platinum coated with a thin film of platinum black 22 in a conventional manner for purposes of adsorbing hydrogen. The electrode is also coated with a thin semi-permeable film or membrane 23 which constitutes one of the essential features of the invention. The tube 20 is supported by means of a cork or stopper 24 within an outer tube or conduit 26 which, at its lower end, encloses approximately one half of the electrode 21. This tube 26 is also provided with a branch or arm 28 connected to a convenient source of hydrogen gas (not shown).

For purposes of determining the difference of potential between the hydrogen electrode and the calomel electrode, a potentiometer including a fixed resistance 30 and a suitable source of electrical current of constant value, e. g. a dry cell 32 connected to opposite ends of the resistance by means of conductors 34 and 36, are employed. The resistance 30 is connected at one end to the calomel electrode by means of a conductor 38 which extends into the mercury in the tube 16. The resistance is likewise connected to the hydrogen ion electrode by means of a conductor 40 having a sliding contact with the resistance, and a conductor 41, one end of which extends into the mercury in the tube 20. The adjacent ends of the conductors are joined by means of a galvanometer 42. The difference in potential between the conductors 38 and 40 may be determined conveniently by means of a sensitive volt meter 44 connected to these respective conductors by means of conductors 46 and 48.

In the operation of the apparatus, the various elements are set up as indicated in the drawing with the cell 32 so disposed that the drop in potential across the resistance will oppose the drop between the electrodes and with the conductors 38 and 41 dipping respectively into the mercury in the tubes 16 and 20. The vessel 14 and the arm 12 should be completely filled with potassium chloride in order to insure an electrolytic path of conductance from the calomel electrode through the solution within the vessel 10 to the hydrogen electrode and with a constant current flowing from the cell 32 through the resistance 30.

At the same time, a continuous flow of hydrogen gas through the tube 26 and about the electrode 21 is maintained. A considerable amount of hydrogen diffuses through the membrane 23 and upon coming into contact with the coating 22 upon the electrode may leave this surface again as hydrogen ions. These ions then tend to re-diffuse through the membrane and into the solution. Since the difference in potential between the hydrogen electrode and the calomel electrode is a function of the concentration of hydrogen ions in the solution, the voltage drop across the portion of the resistance 30 between the conductors 38 and 40, when the latter conductor is so adjusted that the drop is equal and opposite to the potential of the cell, constitutes a convenient means of determining the acidity or alkalinity of the solution. Manifestly, proper balance between the electromotive force across the resistance 30 and that between the calomel and hydrogen electrode 21 is indicated by zero deflection in the galvanometer 42.

The laws governing the operation of hydrogen and calomel electrodes are well understood. Since the behavior of the electrodes is not appreciably changed by the interposition of a semipermeable screen about the hydrogen electrode, detailed discussion of these laws is believed to be unnecessary.

The film 23 upon the electrode 21 constituting the subject matter of the present invention may be formed of substantially any semipermeable material. For example, it is found by actual experience that it may be formed conveniently by inserting the electrode into a ten percent solution of collodion (a solution of nitrocellulose in ether and alcohol) and permitting the film retained upon the electrode after withdrawal of the latter to dry.

Suitable coatings might also be formed from cellulose acetate or viscose (cellulose xanthate) in similar manner. It would also be practicable to form a barrier of goldbeater's skin or similar tissue either by wrapping the skin about the electrode or by forming a cup of skin into which the electrode is permitted to dip. It is, of course, to be understood that the invention is not limited to the use of films of any particular material, but comprises broadly the use of any relatively thin membrance or film which is sufficiently permeable in nature to permit passage of $H_2O$, hydrogen gas, hydrogen ions and hydroxyl ions. It is essential that it merely functions as a barrier to the passage of relatively large colloidal suspended particles of rubber hydrocarbon that normally would be deposited upon the hydrogen electrode by reason of the difference in potential between the particles and the electrode caused by the flow of current between the electrodes during the period when the point of contact of the conductor 40 with the resistance 30 is being so adjusted that drop in potential across the electrodes will be balanced by the equal but opposite drop across the resistance created by the flow of current from the cell 32 through the latter.

In practicing the invention, it is, of course, to be understood that a constant flow of hydrogen is maintained about the electrode 21 by supplying gas through the conduit 28. This gas flows down through the tube 26 about the electrode 21 and a certain amount of it permeates or diffuses through the film upon the electrode and upon coming into contact with the latter, it assumes a positive charge. It then re-diffuses as hydrogen ions through the membrane and is discharged into the solution at a rate which is governed by the hydrogen ion concentration of the bath in which the electrode is immersed. Since the principles involved in the operation of the hydrogen ion electrodes are well understood, it is not deemed necessary to discuss them in detail at this time.

By coating hydrogen ion electrodes with a permeable membrane in accordance with the provision of this invention, it is possible to employ the same electrode indefinitely without necessity of removing it from the solution for purposes of removing impermeable deposits of rubber formed by deposition of negatively charged particles from the colloidal suspension which constitutes the latex. For these reasons, the invention is particularly applicable for the taking of continuous readings in a flow of latex from storage tanks to coagulating baths.

Although I have described and illustrated but the preferred embodiment of the invention, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of novelty reside in the invention.

What I claim is:

1. A hydrogen ion electrode which is coated with nitrocellulose.

2. A hydrogen ion electrode which is coated with a continuous film comprising a semipermeable cellulose derivative.

3. A hydrogen ion electrode which is coated with a continuous film comprising a semipermeable cellulose ester.

4. A hydrogen ion electrode which is coated with cellulose acetate.

5. A hydrogen ion electrode which is coated with viscose.

In witness whereof, I have hereunto signed my name.

Signed at Appleton, in the county of Outagamie and State of Wisconsin, U. S. A., this 2nd day of January, 1931.

BEN W. ROWLAND.